(12) United States Patent
Aoki

(10) Patent No.: US 7,802,912 B2
(45) Date of Patent: Sep. 28, 2010

(54) ILLUMINATION DEVICE AND DISPLAY DEVICE

(75) Inventor: Kentaroh Aoki, Katsushika-ku (JP)

(73) Assignee: Sharp Kabushiki Kaisha, Osaka (JP)

( * ) Notice: Subject to any disclaimer, the term of this patent is extended or adjusted under 35 U.S.C. 154(b) by 211 days.

(21) Appl. No.: 11/912,017

(22) PCT Filed: May 15, 2006

(86) PCT No.: PCT/JP2006/309655

§ 371 (c)(1),
(2), (4) Date: Oct. 19, 2007

(87) PCT Pub. No.: WO2006/134741

PCT Pub. Date: Dec. 21, 2006

(65) Prior Publication Data

US 2009/0073677 A1    Mar. 19, 2009

(30) Foreign Application Priority Data

Jun. 13, 2005  (JP) ............................. 2005-172481

(51) Int. Cl.
*F21V 21/00*  (2006.01)
*G02F 1/13357*  (2006.01)
(52) U.S. Cl. ...................... 362/614; 362/634; 362/225; 362/260
(58) Field of Classification Search ................ 362/613, 362/614, 225, 260, 84, 634; 349/70
See application file for complete search history.

(56) References Cited

U.S. PATENT DOCUMENTS

| | | | | |
|---|---|---|---|---|
| 1,930,085 | A * | 10/1933 | Fehse | ......................... 362/225 |
| D121,591 | S * | 7/1940 | Heath | ......................... D26/78 |
| 6,635,987 | B1 * | 10/2003 | Wojnarowski et al. | ...... 313/498 |
| 7,090,365 | B2 * | 8/2006 | Ogawa et al. | ................. 362/29 |
| 7,134,767 | B2 * | 11/2006 | Liao et al. | .................... 362/225 |
| 7,510,317 | B2 * | 3/2009 | Murakami et al. | .......... 362/634 |

(Continued)

FOREIGN PATENT DOCUMENTS

JP    3-266303    * 11/1991

(Continued)

OTHER PUBLICATIONS

Official communication issued in the International Application No. PCT/JP2006/309655, mailed on Jun. 20, 2006.

*Primary Examiner*—Stephen F. Husar
*Assistant Examiner*—Peggy A. Neils
(74) *Attorney, Agent, or Firm*—Keating & Bennett, LLP

(57) ABSTRACT

A display device includes a plurality of cold cathode tubes that define linear light sources and are arranged in an aligned state in a backlight device. A direction that is perpendicular or substantially perpendicular to a surface S along the direction of alignment of the cold cathode tubes is set as the illumination direction. The cold cathode tubes are supported in two kinds of postures whose axes intersect with each other. A first inclined cold cathode tube and a second inclined cold cathode tube are arranged in postures that incline the axis of each relative to the direction of illumination. The overall distribution of light intensity can be expanded by the amount of the relative inclination angles of the first inclined cold cathode tube and the second inclined cold cathode tube.

5 Claims, 15 Drawing Sheets

U.S. PATENT DOCUMENTS

| | | | |
|---|---|---|---|
| 2003/0043594 A1* | 3/2003 | Chen et al. | 362/555 |
| 2005/0057946 A1* | 3/2005 | Kim | 362/561 |
| 2005/0083711 A1* | 4/2005 | Wu et al. | 362/558 |

FOREIGN PATENT DOCUMENTS

| | | | |
|---|---|---|---|
| JP | 03-266303 A | | 11/1991 |
| JP | 7-234405 | * | 9/1995 |
| JP | 2001-022285 A | | 1/2001 |
| JP | 2004-311353 A | | 11/2004 |
| JP | 2004-342587 A | | 12/2004 |

* cited by examiner

ILLUMINATION DEVICE AND DISPLAY DEVICE

BACKGROUND OF THE INVENTION

1. Field of the Invention

The present invention relates to an illumination device and a display device.

2. Description of the Related Art

A liquid crystal display device broadly consists of a liquid crystal panel for displaying images and a backlight device as an external light source. In particular, a backlight device that is disposed at the rear side of a liquid crystal panel is referred to as a "direct type".

A device described in Japanese Patent Laid-Open No. 2001-22285 is known as one example of this kind of direct type backlight device. As shown in FIG. 13A and FIG. 13B, this backlight device 1 consists of a base 2 that has a box shape in which the top surface side is open, a plurality of fluorescent tubes 3 that are mounted inside the base 2, and a plurality of optical sheets 4 that are disposed in a state in which they are superimposed in the open portion of the base 2. Each of the fluorescent tubes 3 are supported with respect to the base 2 in a posture in which the axis of each tube is parallel to each other and also to the surface along the direction of alignment. Light that is emitted from each of the fluorescent tubes 3 is supplied to the liquid crystal panel through the optical sheets 4.

The fluorescent tubes 3 as the light source of the backlight device 1 are one kind of linear light source. The distribution of light intensity of these light sources is as follows. More specifically, as shown in FIG. 14, when the linear light source (fluorescent tube 3) is viewed laterally in the axial direction thereof, the light intensity is strongest in a direction that is perpendicular to the axial direction and the light intensity gradually weakens as the viewing direction nears the axial direction from the perpendicular direction.

Accordingly, when the fluorescent tubes 3 are disposed in the manner shown in FIG. 13A and FIG. 13B, there is a problem that although the backlight device 1 appears sufficiently bright when viewed from the front surface in the illumination direction, the backlight device 1 appears relatively dark when viewed from a diagonal direction.

SUMMARY OF INVENTION

In order to overcome the problems described above, preferred embodiments of the present invention provide a display device having an enlarged range of the distribution of light intensity.

Preferred embodiments of the present invention provide an illumination device in which a plurality of linear light sources are arranged in an aligned state, wherein the linear light sources are supported in two or more kinds of postures whose axes intersect with each other, and in which a linear light source arranged in one posture is disposed in a posture in which the axis thereof is relatively inclined with respect to a linear light source arranged in another posture.

With regard to the distribution of light intensity of a linear light source, the light intensity is strongest in a direction that is perpendicular or substantially perpendicular to the axial direction thereof and the light intensity gradually weakens as the direction approaches the axial direction from the perpendicular or substantially perpendicular direction. By adopting a configuration as in preferred embodiments of the present invention in which the linear light sources are supported in two or more kinds of postures whose axes intersect with each other, and in which a linear light source arranged in one posture is disposed such that the axis thereof is relatively inclined with respect to a linear light source arranged in another posture, the angular range of the overall distribution of light intensity can be expanded by the amount of that relative angle of inclination. It is therefore possible to ensure sufficient brightness, even when the illumination device is viewed diagonally. It is also possible to alleviate polarization of the overall distribution of light intensity.

The following configurations are preferable as implementations of preferred embodiments of the present invention:

(1) A configuration having a first inclined linear light source that is supported in a posture in which the axis is inclined with respect to a surface along a direction of alignment of the linear light sources, and a second inclined linear light source that is supported in a posture in which the axis is inclined to an opposite side with respect to the first inclined linear light source in a condition that sandwiches the surface along the direction of alignment of the linear light sources. It is thus possible to ensure sufficient brightness when viewing the illumination device from either side that sandwiches the front surface direction when the illumination device is viewed from a diagonal direction.

(2) A configuration in which an angle of inclination of the axis of the first inclined linear light source and an angle of inclination of the axis of the second inclined linear light source with respect to a surface along the direction of alignment of the linear light sources are set to be substantially identical. It is thereby possible to make the overall distribution of light intensity substantially symmetrical. Accordingly, the brightness can be made uniform when viewing from either side that sandwiches the front surface direction when viewing the illumination device from a diagonal direction.

(3) A configuration having parallel linear light sources that are supported in a substantially parallel posture with respect to a surface along the direction of alignment of the linear light sources. It is thereby possible to ensure sufficient brightness when the illumination device is viewed from the front face.

(4) A configuration in which the axes of adjacent linear light sources are disposed so as to be inclined towards each other. It is thereby possible to make the overall brightness uniform.

(5) A configuration in which the linear light source includes a hot cathode tube, a cold cathode tube, or an electrical discharge tube such as a xenon tube.

(6) A configuration is which the linear light source includes an electroluminescence element such as a LED.

(7) A configuration comprising a display component for displaying an image or the like and an optical component that is disposed between the display component and the illumination device.

(8) A configuration in which the display component electrically controls a deflection property of an electromagnetic wave. It is thereby possible to display an image by electrically controlling a deflection property of an electromagnetic wave.

(9) A configuration in which the display component includes a liquid crystal panel.

(10) A configuration in which the display component controls the intensity of an electromagnetic wave by physical or mechanical shuttering. It is thereby possible to display an image by controlling the intensity of an electromagnetic wave by physical or mechanical shuttering.

(11) A configuration in which the display component, the optical component, and the illumination device are arranged in a configuration in which they are superimposed on each other in order.

According to various preferred embodiments of the present invention, a range of distribution of light intensity can be expanded.

Other features, elements, steps, characteristics and advantages of the present invention will be described below with reference to preferred embodiments thereof and the attached drawings.

DETAILED DESCRIPTION OF PREFERRED EMBODIMENTS

First Preferred Embodiment

The first preferred embodiment of the present invention will now be described using FIG. 1 to FIG. 4. In the first preferred embodiment, a liquid crystal display device 10 that is one kind of display device is described. In this connection, in the following description, the upward and downward directions are in accordance with the illustration of FIG. 2.

Figure 1:
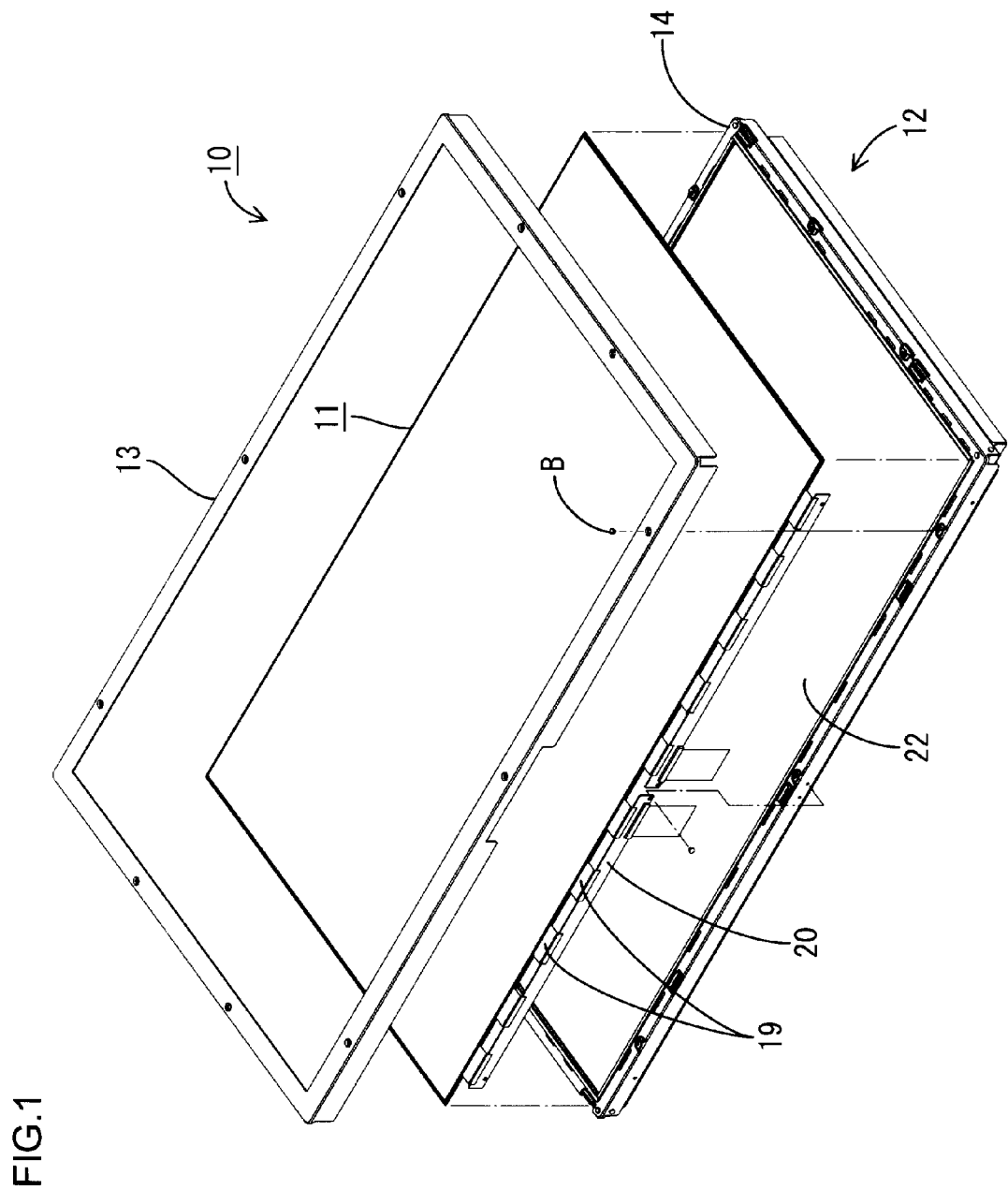
FIG. 1 is an exploded perspective view of a liquid crystal display device according to a first preferred embodiment of the present invention.

As shown in FIG. 1, the liquid crystal display device 10 preferably includes a liquid crystal panel 11 for displaying images and the like and having translucency, a backlight device 12 as an external light source that is disposed on the rear side (back surface side) thereof, and a substantially frame-shaped bezel 13 for retaining the liquid crystal panel 11. The liquid crystal panel 11 is configured to be received by a frame 14 that defines a backlight device 12 and to be retained in a state in which it is sandwiched between the frame 14 and the bezel 13 that is fixed to the frame 14 from the front surface by a screw B.

Figure 2:
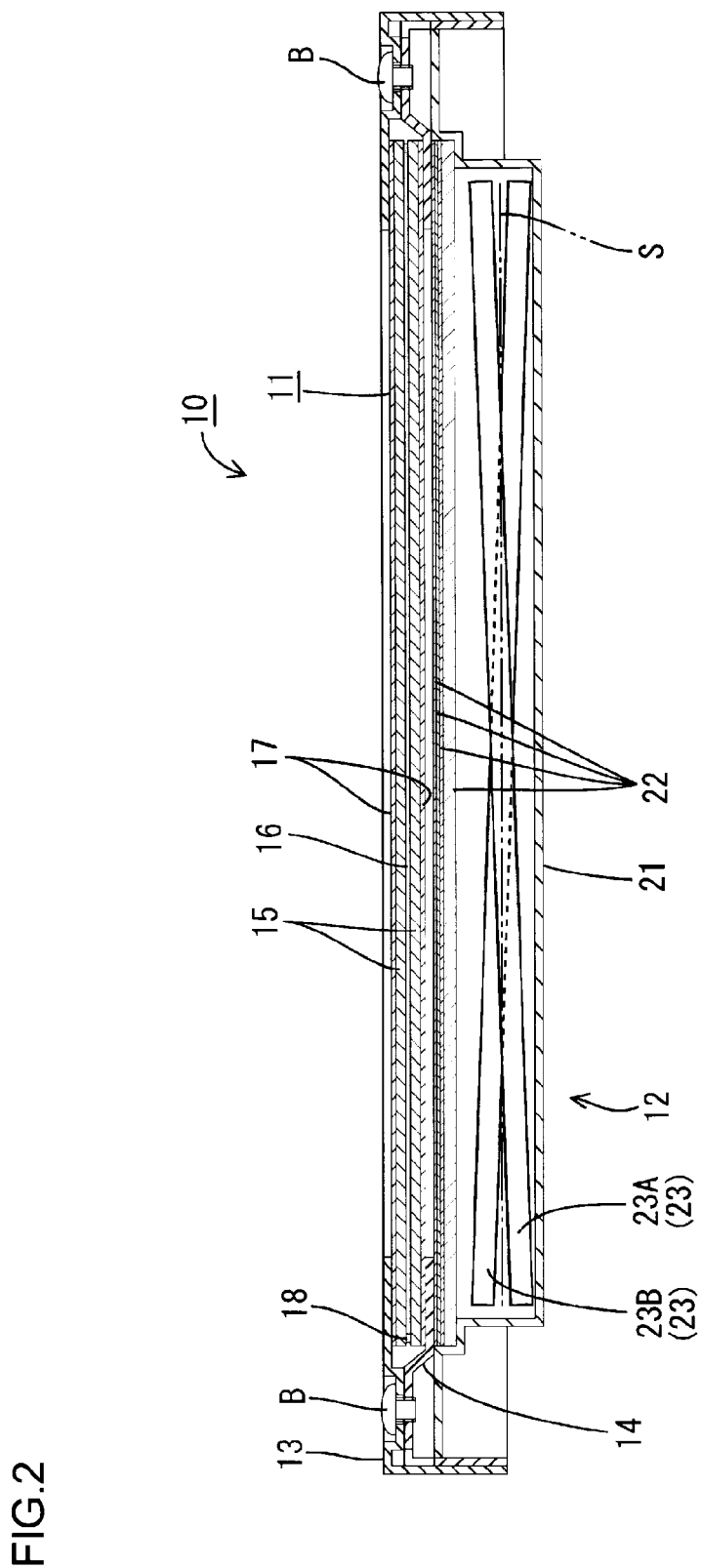
FIG. 2 is a sectional view of the liquid crystal display device.

As shown in FIG. 2, the liquid crystal panel 11 preferably includes a pair of glass substrates 15, liquid crystal 16 that is filled between the two glass substrates 15, and a pair of polarizing plates 17 that are attached to the outer surface (the surface on the opposite side to the liquid crystal 16 side) of the two glass substrates 15. The two glass substrates 15 are pasted together in a state in which they face each other with a predetermined gap formed between them by a spacer. The liquid crystal 16 that is filled between the glass substrates 15 is surrounded by a sealing compound 18. In the glass substrate 15 on the rear side, switching elements (for example, TFTs) that are connected to a source wiring and a gate wiring that are mutually perpendicular are arranged in a state in which pixel electrodes of R, G, and B define a matrix shape, respectively, on the glass substrate 15 on the rear side. At an end of the glass substrate 15 on the rear side, one end side of a SOF 19 (system on film) is connected through an anisotropic conductive film to the source wiring or the gate wiring, and a print substrate 20 is connected to the other end side of the SOF 19. The print substrate 20 is connected by a screw to the frame 14 in a vertical posture in a manner causing the SOF 19 to bend.

Next, the backlight device 12 will be described in detail. As shown in FIG. 2, the backlight device 12 preferably includes a metallic base 21 that forms a substantially rectangular box shape in which the top surface side (liquid crystal panel side) is open, a plurality of optical sheets 22 (for example, four sheets including, in order from the bottom side, a diffusing plate, a diffusing sheet, a lens sheet, and a brightness enhancing sheet) that are attached so as to cover the open portion of the base 21, a frame 14 that can retain the optical sheets 22 in a state in which they are sandwiched between the frame 14 and the base 21, and a plurality of (for example, ten tubes in FIG. 3) cold cathode tubes 23 defining linear light sources that are housed inside the base 21.

Each optical sheet 22 is a component for converting a substantially linear shape light that is emitted from each cold cathode tube 23 into a sheet shape, and preferably has a substantially rectangular sheet shape that is larger than the display region of the liquid crystal display device 10. The optical sheets 22 are configured so as to be stacked vertically and retained in a state in which an outer peripheral margin portion that is further on the outer side than the display region is sandwiched between an outer peripheral margin portion of the base 21 on the rear side and the frame-shaped frame 14 on the front surface side. Thus, according to the present preferred embodiment, the backlight device 12 integrally includes the optical sheets 22.

The cold cathode tube 23 will now be described in detail. The cold cathode tube 23 is one kind of electrical discharge tube. The configuration and light emitting principles thereof are broadly as follows. The cold cathode tube 23 preferably includes electrodes at both ends of an elongated, substantially cylindrical glass tube that encapsulates mercury therein. Electrons are emitted when a high voltage is instantaneously applied between the two electrodes. When the electrons collide with mercury atoms, ultraviolet rays are released from the mercury atoms. Those ultraviolet rays are converted into visible light rays by fluorescent material that is coated on the inside of the glass tube to thereby emit light.

Figure 3:
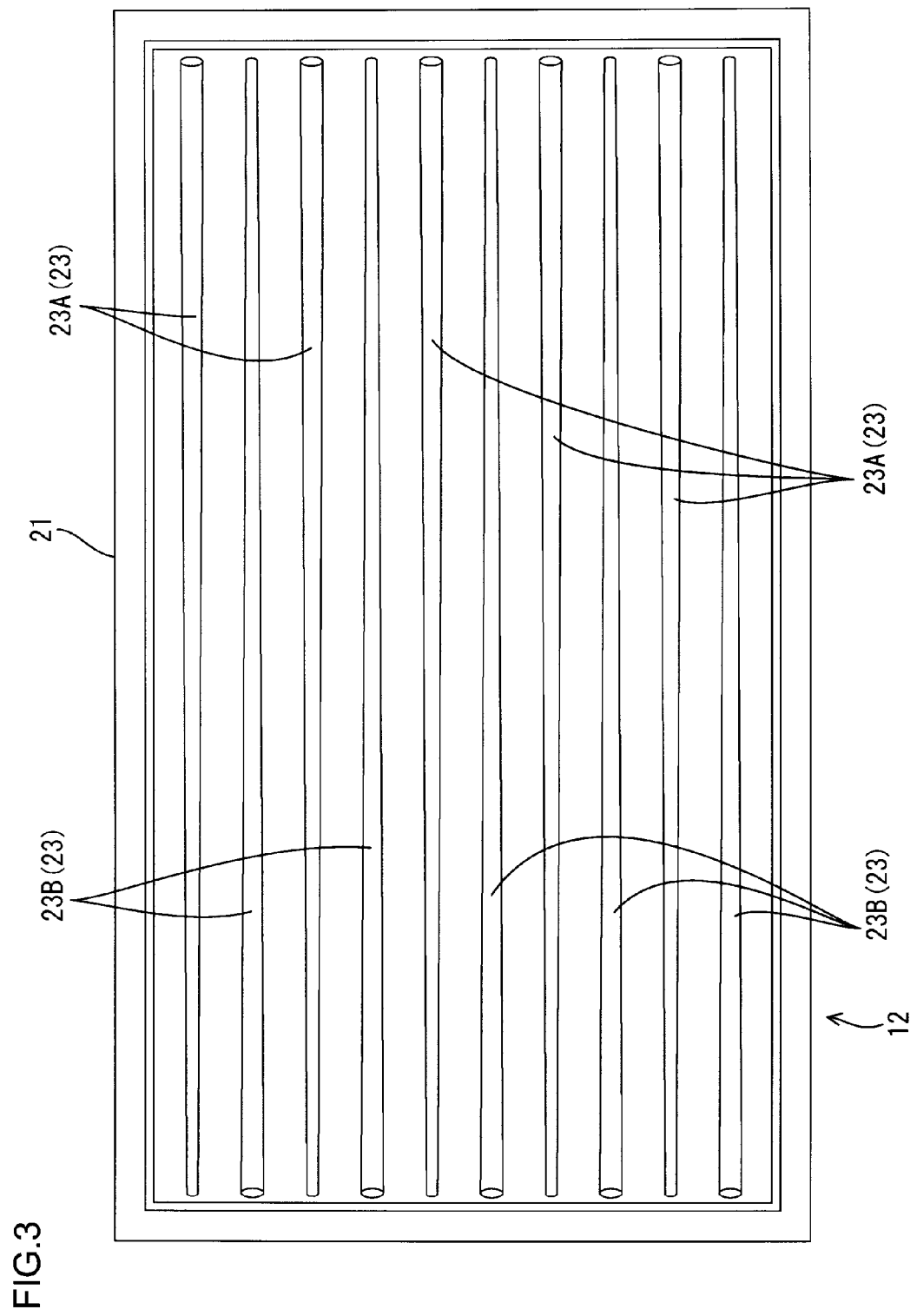
FIG. 3 is a plan view of a backlight device from which a frame and an optical sheet are removed.

Next, the arrangement of the cold cathode tubes 23 will be described in detail. As shown in FIG. 3, each cold cathode tube 23 is disposed in a state in which the axial direction thereof is parallel or substantially parallel with the lengthwise direction of the base 21 (liquid crystal panel 11) and in which the cold cathode tubes 23 are aligned along the widthwise direction of the base 21 (liquid crystal panel 11). The interval (pitch) between adjacent cold cathode tubes 23 is preferably set to be substantially the same. The direction of alignment of each cold cathode tube 23 is parallel or substantially parallel with the surface direction of the liquid crystal panel 11. A direction that is substantially perpendicular to a surface S (a surface that is substantially parallel with the surface of the liquid crystal panel 11 or the surface of the bottom of the base 21) along the direction of alignment of the cold cathode tube 23 is set as the direction of illumination (arrow direction shown in FIG. 4; front surface direction) of the backlight device 12. In this connection, the surface S along the direction of alignment of each cold cathode tube 23 is represented by a chain double-dashed line in FIG. 2 and FIG. 4.

As shown in FIG. 2 and FIG. 3, the cold cathode tubes 23 are supported by an unshown retaining component in two different kinds of postures whose axes intersect with each other inside the base 21. More specifically, each of the cold cathode tubes 12 is supported in a posture in which its axis is inclined with respect to the surface S along the direction of alignment thereof. Among them, a first inclined cold cathode tube 23A is disposed in a posture in which it is inclined in the counterclockwise direction as shown in FIG. 2 with respect to the surface S along the direction of alignment, while a second inclined cold cathode tube 23B is disposed in a posture in which it is inclined in the clockwise direction as shown in FIG. 2 with respect to the surface S along the direction of alignment, that is, inclined to the opposite side of the aforementioned first inclined cold cathode tube 23A to thereby sandwich the surface S along the direction of alignment. In other words, the cold cathode tubes 23 are supported in postures that are inclined to each other so as to form an "X" when viewed from the side along the axial direction thereof. To describe this in another way, the first inclined cold cathode tube 23A and the second inclined cold cathode tube 23B are arranged in postures in which the axis of each is relatively inclined in the direction of the illumination side.

In this connection, when distinguishing the cold cathode tubes 23, the character "A" is added to the representative numeral of the first inclined cold cathode tube and the character "B" is added to the representative numeral of the second inclined cold cathode tube. In contrast, when referring to the cold cathode tubes 23 generally without distinguishing them, the character "A" or "B" is not added to the representative numeral.

More specifically, for the first inclined cold cathode tube 23A, the distance between the left side end and the liquid crystal panel 11 as shown in FIG. 2 is set to be larger than the distance between the right side end and the liquid crystal panel 11 as shown in the same Fig. For the second inclined cold cathode tube 23B the distance between the left side end and the liquid crystal panel 11 as shown in FIG. 2 is set to be smaller than the distance between the right side end and the liquid crystal panel 11 as shown in the same Fig. An angle of inclination that the first inclined cold cathode tube 23A forms with respect to a surface S along the direction of alignment of the cold cathode tubes 23 is preferably substantially the same as the same angle of inclination of the second inclined cold cathode tube 23B. Further, the height position in the center section in the length direction of the first inclined cold cathode tube 23A, i.e., the distance from the liquid crystal panel 11, is also preferably substantially the same as the same height position of the second inclined cold cathode tube 23B. That is to say, the first inclined cold cathode tube 23A and the second inclined cold cathode tube 23B are disposed in postures that are symmetric with respect to the surface S along the direction of alignment of the cold cathode tubes 23.

As shown in FIG. 3, in the backlight device 12, the first inclined cold cathode tube 23A and the second inclined cold cathode tube 23B are alternately disposed, and as a result, adjacent cold cathode tubes 23 are disposed such that their axes intersect (the adjacent cold cathode tubes 23 incline relatively). More specifically, the number of first inclined cold cathode tubes 23A and the number of second inclined cold cathode tubes 23B are preferably the same number (for example, five tubes each in FIG. 3), and these are disposed so as to be alternately aligned (every other tube).

The present preferred embodiment is configured as described above. The action thereof will now be described. In the liquid crystal display device 10 having the above described configuration, in order to display an image on the liquid crystal panel 11 it is necessary to cause each cold cathode tube 23 in the backlight device 12 to light, and also to drive each switching element by appropriately supplying signals to each wiring to thereby control the state of disposal of the liquid crystal 16. It is thereby possible to display a desired image on the liquid crystal panel 11.

The distribution of light intensity of the backlight device 12 at a time of lighting will now be described in detail. Each cold cathode tube 23 is a linear light source, and with respect to the individual distribution of light intensity thereof, the light intensity is strongest in a direction that is perpendicular or substantially perpendicular to the axial direction and the light intensity tends to gradually decrease as the direction approaches the axial direction from that perpendicular or substantially direction (see FIG. 10). According to the present preferred embodiment, as shown in FIG. 4, by supporting each cold cathode tube 23 in a posture in which the cold cathode tube 23 is inclined with respect to a surface S along the direction of alignment thereof, the distribution of light intensity of the cold cathode tube 23 is inclined with respect to the direction of illumination (arrow direction shown in FIG. 4; front surface direction) by the amount of the angle of inclination, and the supporting posture of the cold cathode tubes 23 is set to have two kinds of postures whose axes intersect with each other.

Figure 4:
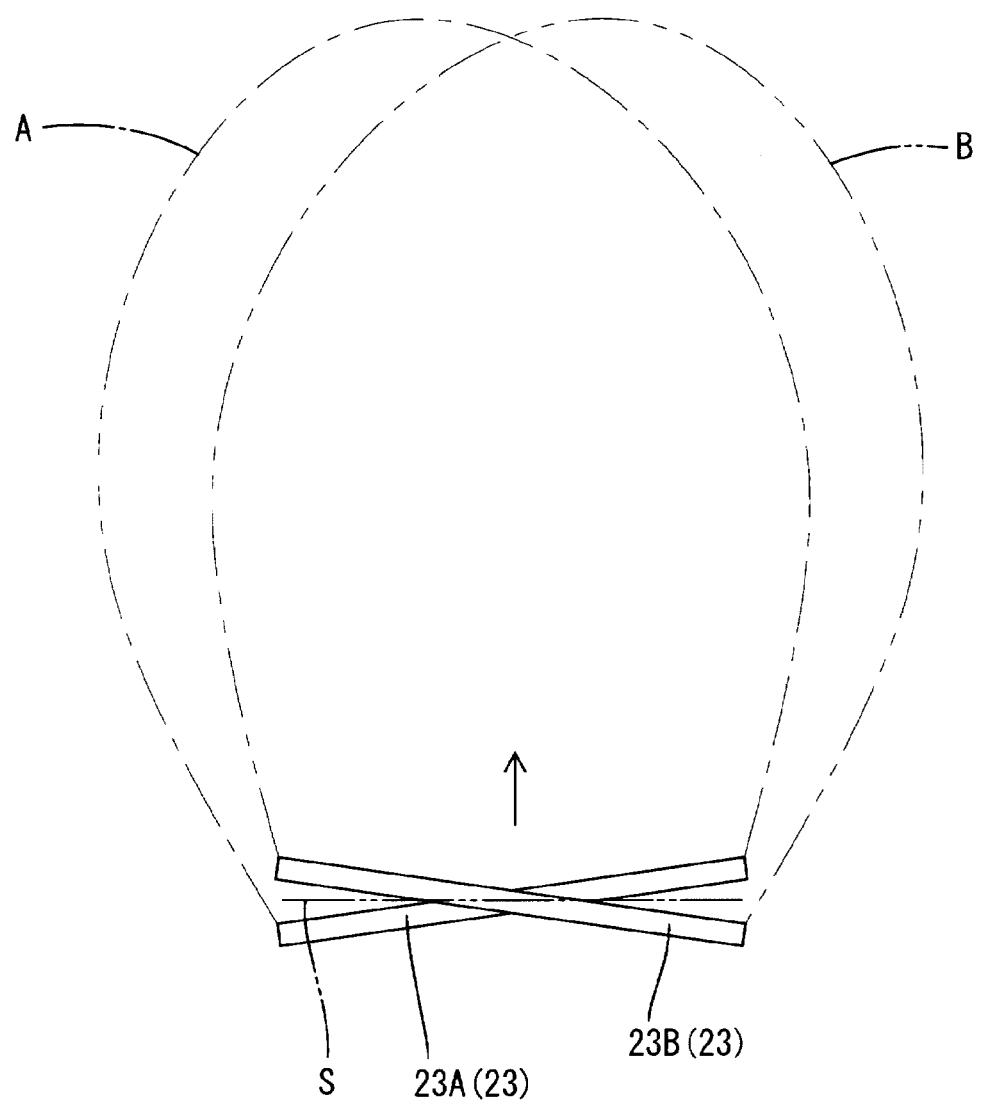
FIG. 4 is an explanatory view of the distribution of light intensity of cold cathode tubes.

More specifically, a distribution of light intensity A of the first inclined cold cathode tube 23A (region surrounded by an alternate long and short dashed line shown in FIG. 4) is inclined in the counterclockwise direction shown in FIG. 4 with respect to the direction of illumination by the amount of the angle of inclination thereof, and a distribution of light intensity B of the second inclined cold cathode tube 23B (region surrounded by a chain double-dashed line shown in FIG. 4) is similarly inclined in the clockwise direction by the amount of the angle of inclination thereof, that is, in the direction to the opposite side of the first inclined cold cathode tube 23A to thereby sandwich the direction of illumination. Accordingly, when the overall distribution of light intensity of the backlight device 12 that adds together the distributions of light intensity of the first inclined cold cathode tube 23A and the second inclined cold cathode tube 23B is viewed, an angular range of a region in which a light intensity greater than a predetermined amount can be obtained expands in both directions to the left and right in the Fig. by the amount of the angle of inclinations of the two cold cathode tubes 23A and 23B as described above (in two directions that are perpendicular or substantially perpendicular to the direction of illumination that sandwich the direction of illumination). Thus, when viewed diagonally with respect to the direction of illumination (front surface direction), the angular range of a region in which sufficient brightness can be obtained is expanded, and hence it is possible to expand the viewing angle of the liquid crystal display device 10 and contribute to improving the display quality.

Further, if a case is assumed in which all the cold cathode tubes are disposed in a horizontal posture, the light intensity in the diagonal direction will be relatively small in comparison to the light intensity in the front surface direction leading to a large difference between the two intensities. Thus, a large polarization will occur in the overall distribution of light intensity. In contrast, according to the present preferred embodiment, since a difference between the light intensity in the front surface direction and the light intensity in the diagonal direction can be reduced by the amount of the increase in the angular range of the overall distribution of light intensity achieved by inclining the cold cathode tubes 23, polarization of the overall distribution of light intensity can be alleviated. It is therefore possible to alleviate an uncomfortable feeling a viewer feels due to a difference when viewing from the front surface direction and when viewing from a diagonal direction, and thus enhance the display quality.

According to the present preferred embodiment as described above, since the cold cathode tubes 23 are supported in two kinds of postures whose axes intersect with each other, and a cold cathode tube 23A (23B) has one posture in which its axis is inclined relative to the direction of illumination side with respect to a cold cathode tube 23B (23A) in the other posture, the angular range of the overall distribution of light intensity can be enlarged by the amount of the relative inclination angles of both postures. It is therefore possible to ensure sufficient brightness even when the liquid crystal display device 10 is viewed diagonally with respect to the direction of illumination. Further, polarization of the overall distribution of light intensity can be alleviated.

Furthermore, since the present preferred embodiment has the first inclined cold cathode tube 23A that is supported in a posture in which its axis is inclined with respect to a surface S along the direction of alignment of the cold cathode tubes 23, and the second inclined cold cathode tube 23B that is supported in a posture in which its axis is inclined to the opposite side in a condition sandwiching the surface S along the direction of alignment of the cold cathode tubes 23 with respect to the first inclined cold cathode tube 23A, it is possible to ensure sufficient brightness when viewed from either side sandwiching the direction of illumination when viewing the liquid crystal display device 10 diagonally with respect to the direction of illumination.

Since the angle of inclination with respect to the surface S along the direction of alignment of the cold cathode tubes 23 for the axis of the first inclined cold cathode tube 23A and the axis of the second inclined cold cathode tube 23B is set to be substantially the same, it is possible to make the overall distribution of light intensity substantially symmetrical with respect to the direction of illumination. Accordingly, it is possible to make the brightness uniform when viewed from either side sandwiching the direction of illumination when viewing the liquid crystal display device 10 diagonally with respect to the direction of illumination.

Further, since the axes of adjacent cold cathode tubes 23 are disposed so as to incline towards each other, the overall brightness can be made uniform.

Second Preferred Embodiment

Figure 6:
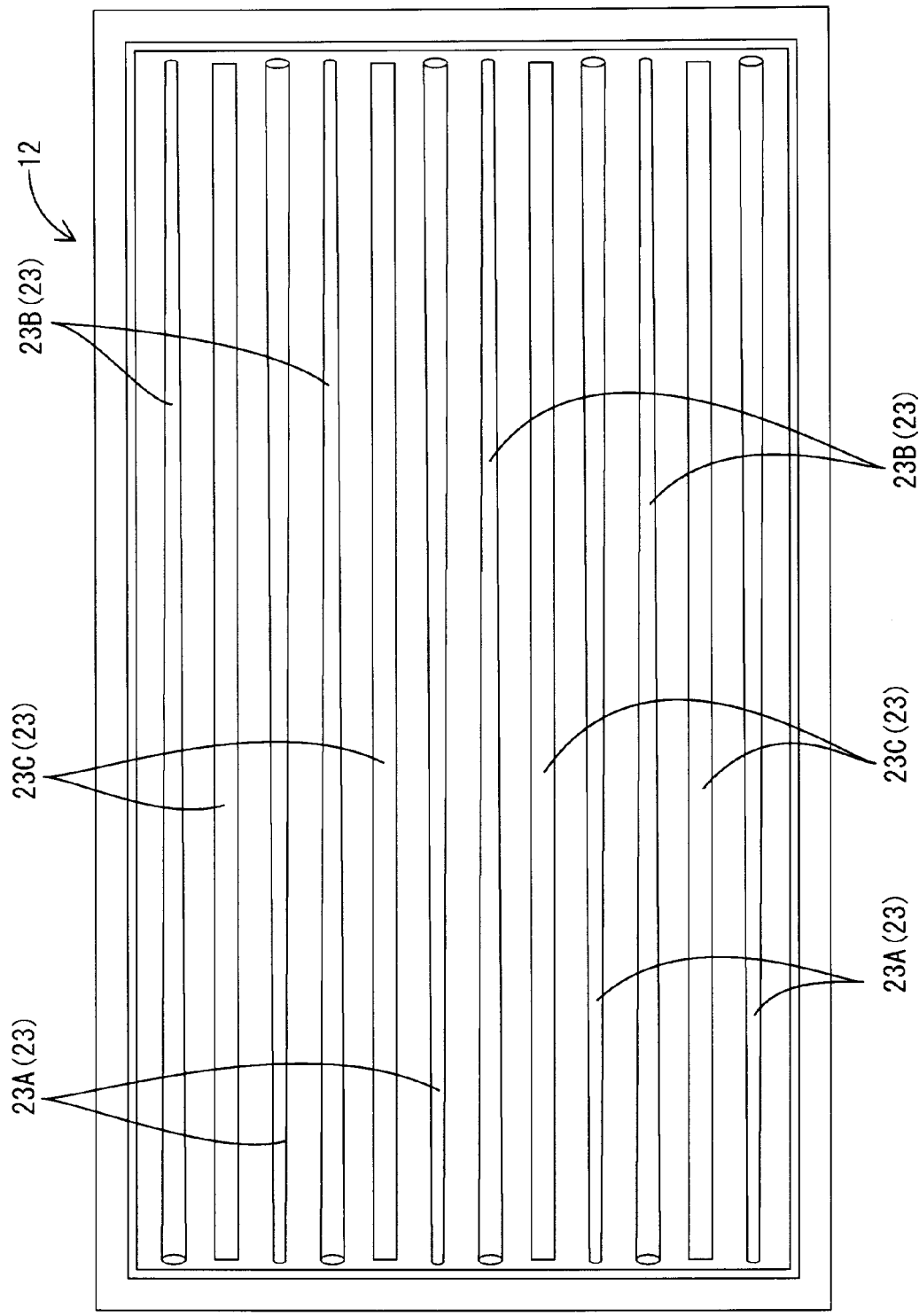
FIG. 6 is a plan view of a backlight device from which a frame and an optical sheet are removed.
Figure 7:
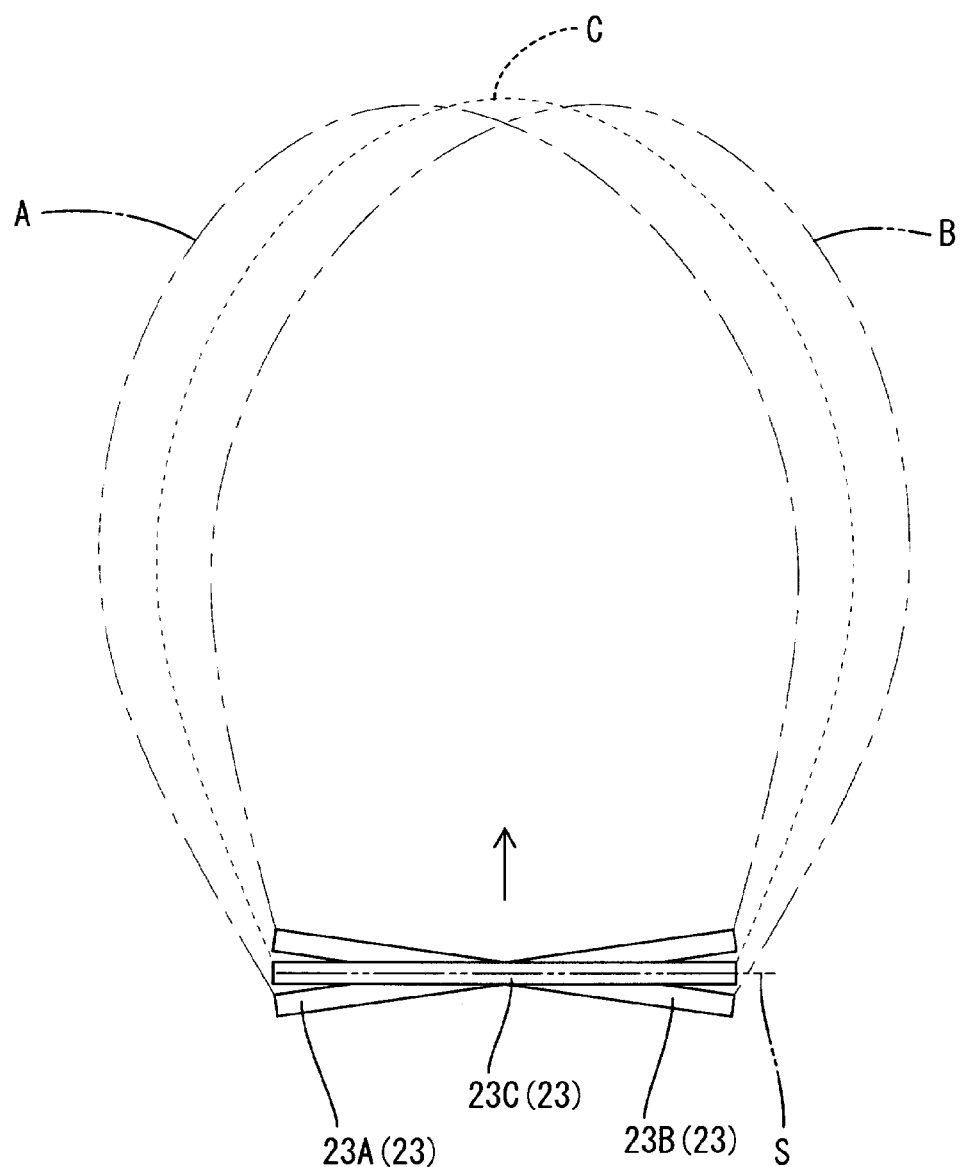
FIG. 7 is an explanatory view of the distribution of light intensity of cold cathode tubes.

The second preferred embodiment of the present invention will now be described with reference to FIG. 5 to FIG. 7. The second preferred embodiment describes a device in which the cold cathode tubes 23 are supported in three kinds of postures whose axes intersect with each other. In the second preferred embodiment, a duplicate description of structures, actions and effects that are the same as in the above described first preferred embodiment is omitted.

Figure 5:
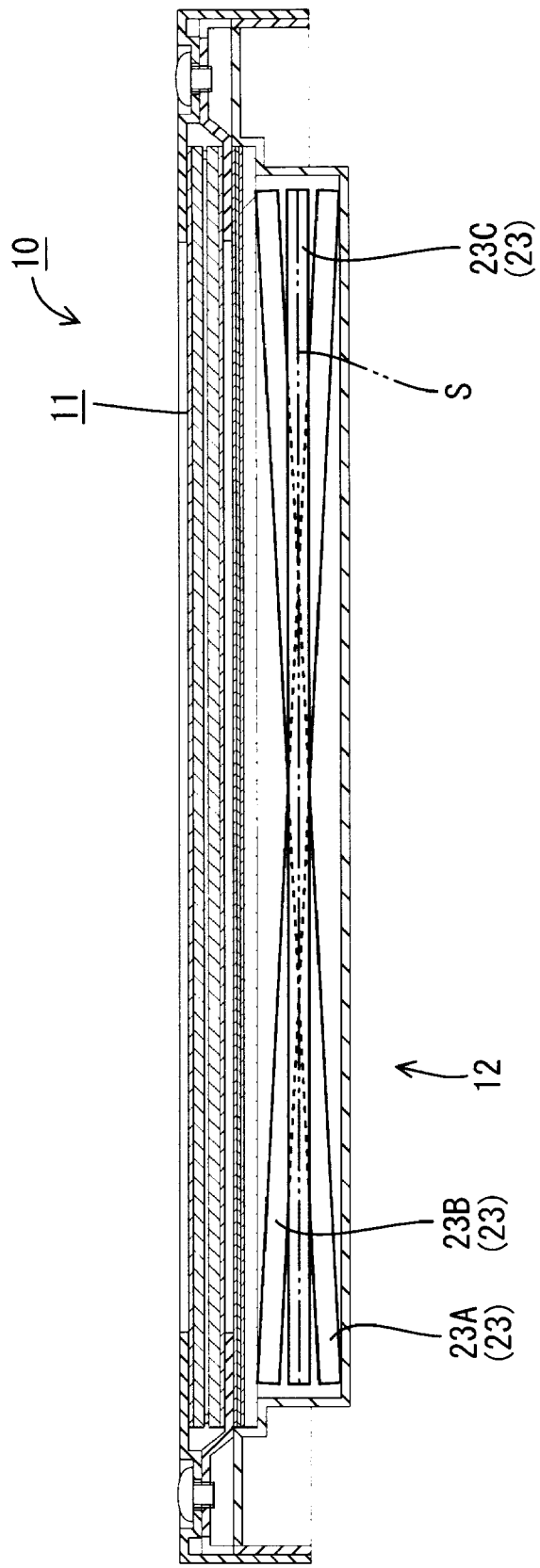
FIG. 5 is a sectional view of the liquid crystal display device according to a second preferred embodiment of the present invention.

As shown in FIG. 5, the backlight device 12 has a parallel cold cathode tube 23C that is supported in a posture that is substantially parallel with the surface S along the direction of alignment of the cold cathode tubes 23, in addition to the first inclined cold cathode tube 23A and the second inclined cold cathode tube 23B that are supported in two kinds of postures so that their axes intersect with each other although both their axes are inclined with respect to the surface S along the direction of alignment of the cold cathode tube 23. In this connection, when distinguishing the cold cathode tubes 23, the character "A" is added to the representative numeral of the first inclined cold cathode tube and the character "B" is added to the representative numeral of the second inclined cold cathode tube as already described above, and further, the character "C" is added to the representative numeral of the parallel cold cathode tube. In contrast, when referring to the cold cathode tubes 23 generally without distinguishing them, the character "A", "B", or "C" is not added to the representative numeral.

It can be said that the parallel cold cathode tube 23C is disposed in a posture in which its axis is inclined relative to the direction of illumination and relative to both the first inclined cold cathode tube 23A and the second inclined cold cathode tube 23B, respectively. The distance between the parallel cold cathode tube 23C and the liquid crystal panel 11 is fixed and constant across the total length thereof. The height position in the center section in the length direction of the parallel cold cathode tube 23C is preferably substantially the same as the same height position of the first inclined cold cathode tube 23A and the second inclined cold cathode tube 23B. Accordingly, when the cold cathode tubes 23 are viewed from the side in the axial direction, they take an overall form in which a horizontal line is added in the center of an "X" (FIG. 5).

The order of aligning the cold cathode tubes 23 in the backlight device 12 is as follows. That is, as shown in FIG. 6, the cold cathode tubes 23 are disposed so as to be aligned in the order of first inclined cold cathode tube 23A, parallel cold cathode tube 23C, and second inclined cold cathode tube 23B from the front (lower) side in FIG. 6. As a result, the axes of adjacent cold cathode tubes 23 are disposed so as to be inclined towards each other. Further, the first inclined cold cathode tube 23A, the parallel cold cathode tube 23C, and the second inclined cold cathode tube 23B are disposed in equal amounts (for example, four tubes each in FIG. 6).

Next, the distribution of light intensity of the backlight device 12 in the present preferred embodiment will be described. As shown in FIG. 7, since the distribution of light intensity of the backlight device 12 includes a distribution of light intensity C (region surrounded by a dashed line as shown in FIG. 7) of the parallel cold cathode tube 23C in addition to the distribution of light intensity A of the first inclined cold cathode tube 23A and the distribution of light intensity B of the second inclined cold cathode tube 23B, the brightness when viewed from the front surface side in the direction of illumination (arrow direction shown in FIG. 7) can be intensified.

In this case, if the angle of inclination is made too big when setting the angle of inclination of the first inclined cold cathode tube 23A and the second inclined cold cathode tube 23B, there will be insufficient brightness towards the front surface side in the direction of illumination. However, by intensifying the brightness towards the front surface side in the direction of illumination by using the parallel cold cathode tube 23C as in the present preferred embodiment, it is possible to make the angle of inclination of the first inclined cold cathode tube 23A and the second inclined cold cathode tube 23B bigger. As a result, with respect to the overall distribution of light intensity of the backlight device 12, an angular range of a region in which a light intensity that is greater than a predetermined size can be obtained, that is, an angular range of a region in which sufficient brightness can be obtained when viewed diagonally with respect to the direction of illumination, can be further enlarged.

Modification Example

A modification example of the above described second preferred embodiment will now be described with reference to FIG. 8. In this modification example, the alignment order of the cold cathode tubes 23 is changed. In this modification example, a duplicate description of structures, actions and effects that are the same as in the above described first and second preferred embodiments is omitted.

Figure 8:
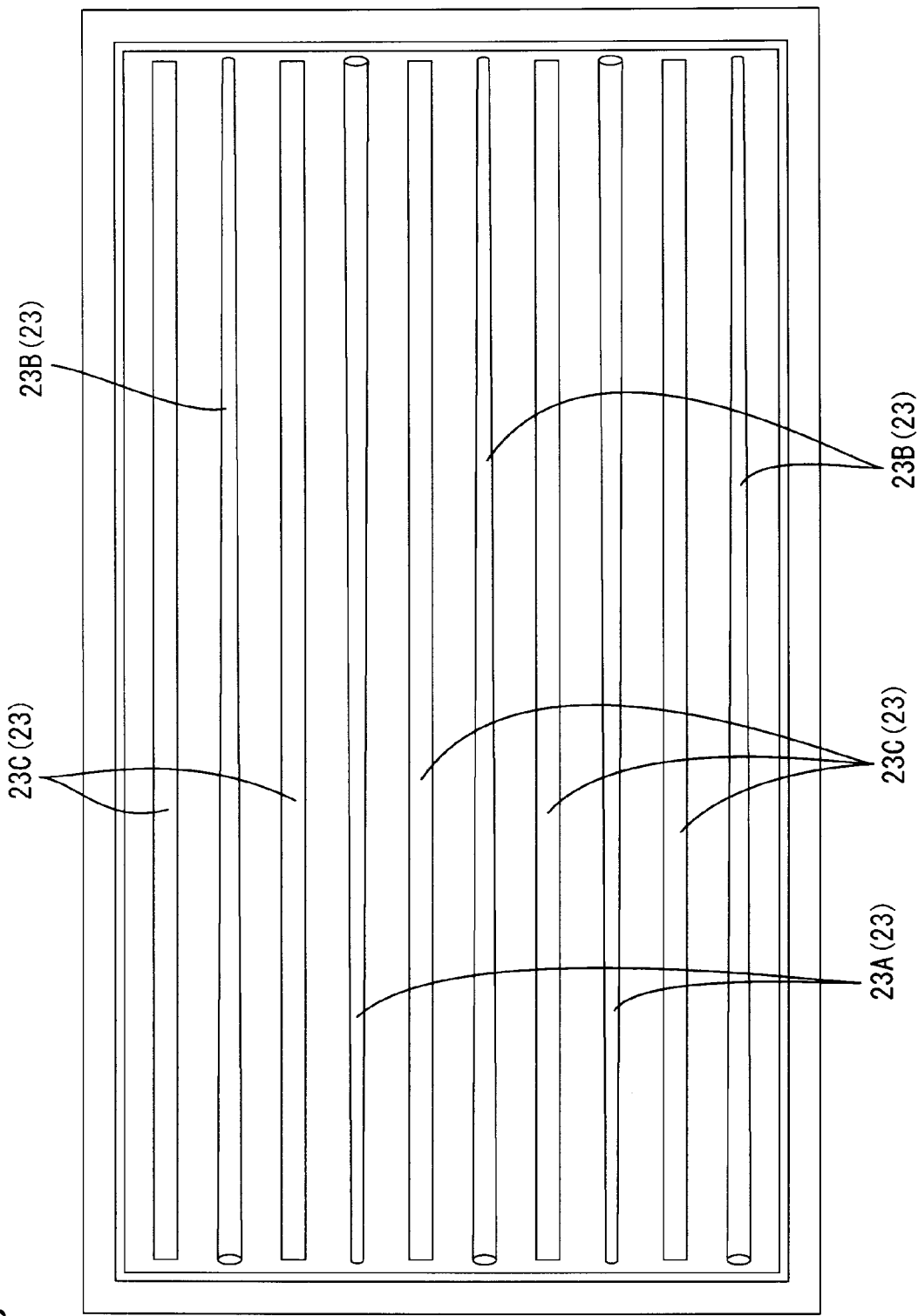
FIG. 8 is a plan view of a backlight device from which a frame and an optical sheet are removed according to a modification example of the second preferred embodiment.

As shown in FIG. 8, the cold cathode tubes 23 are arranged in an order in which the parallel cold cathode tubes 23C are sandwiched between the first inclined cold cathode tubes 23A and the second inclined cold cathode tubes 23B. More specifically, a total of ten tubes are aligned in the order of second inclined cold cathode tube 23B, parallel cold cathode tube 23C, first inclined cold cathode tube 23A, parallel cold cathode tube 23C, second inclined cold cathode tube 23B . . . from the front (lower) side of FIG. 8. Further, the cold cathode tubes 23 are disposed such that the axes of adjacent cold cathode tubes 23 are inclined towards each other. Furthermore, the number of tubes that are set for the first inclined cold cathode tube 23A, the second inclined cold cathode tube 23B, and the parallel cold cathode tube 23C are respectively different.

Third Preferred Embodiment

The third preferred embodiment of the present invention will now be described with reference to FIG. 9 to FIG. 12. The third preferred embodiment describes a specific example of a structure for retaining the cold cathode tube 23. In the third preferred embodiment, a duplicate description of structures, actions and effects that are the same as in the above described first preferred embodiment is omitted.

Figure 9:
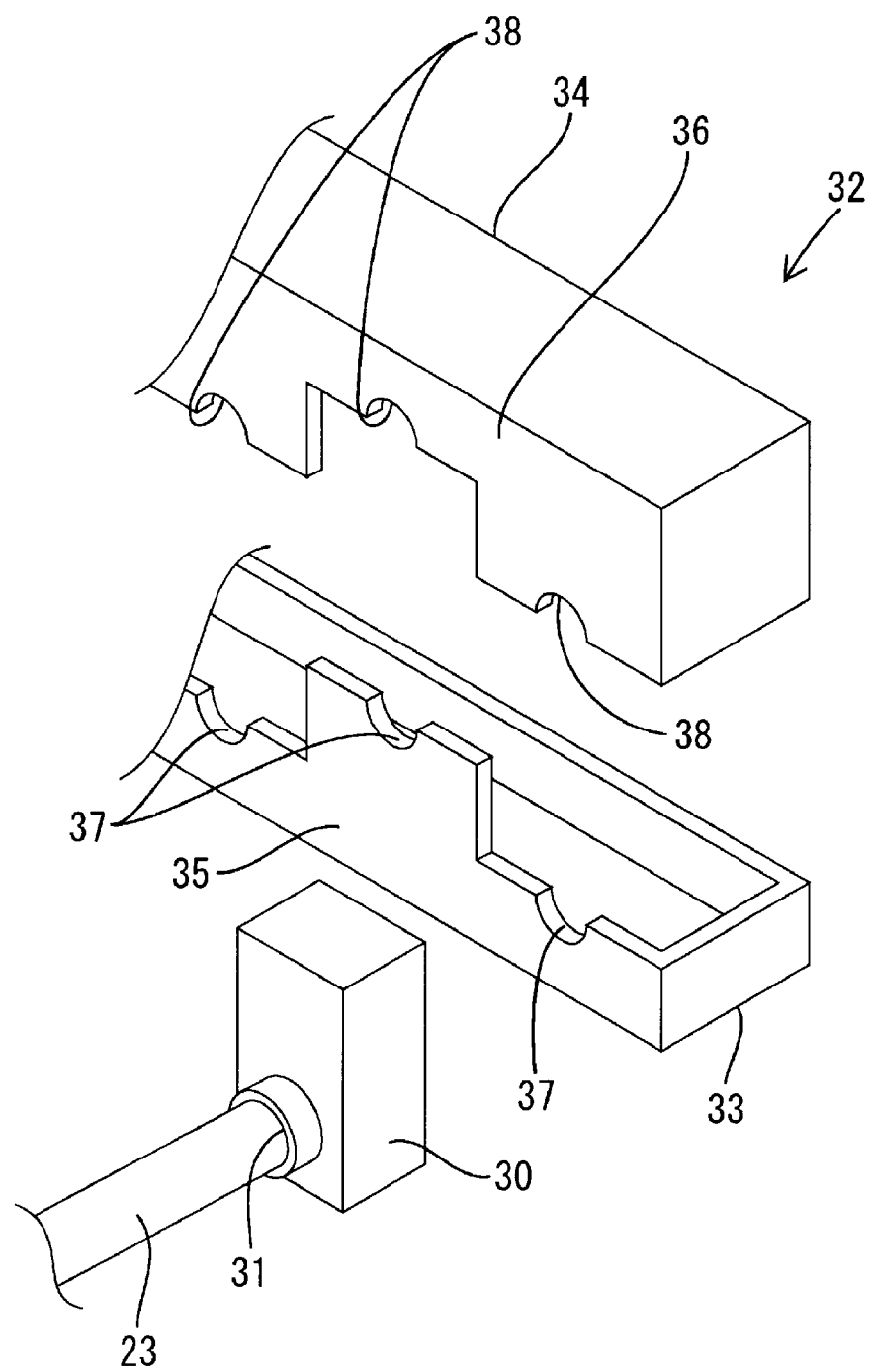
FIG. 9 is an enlarged perspective view that illustrates an outline of a structure for retaining a cold cathode tube according to a third preferred embodiment of the present invention.
Figure 10:
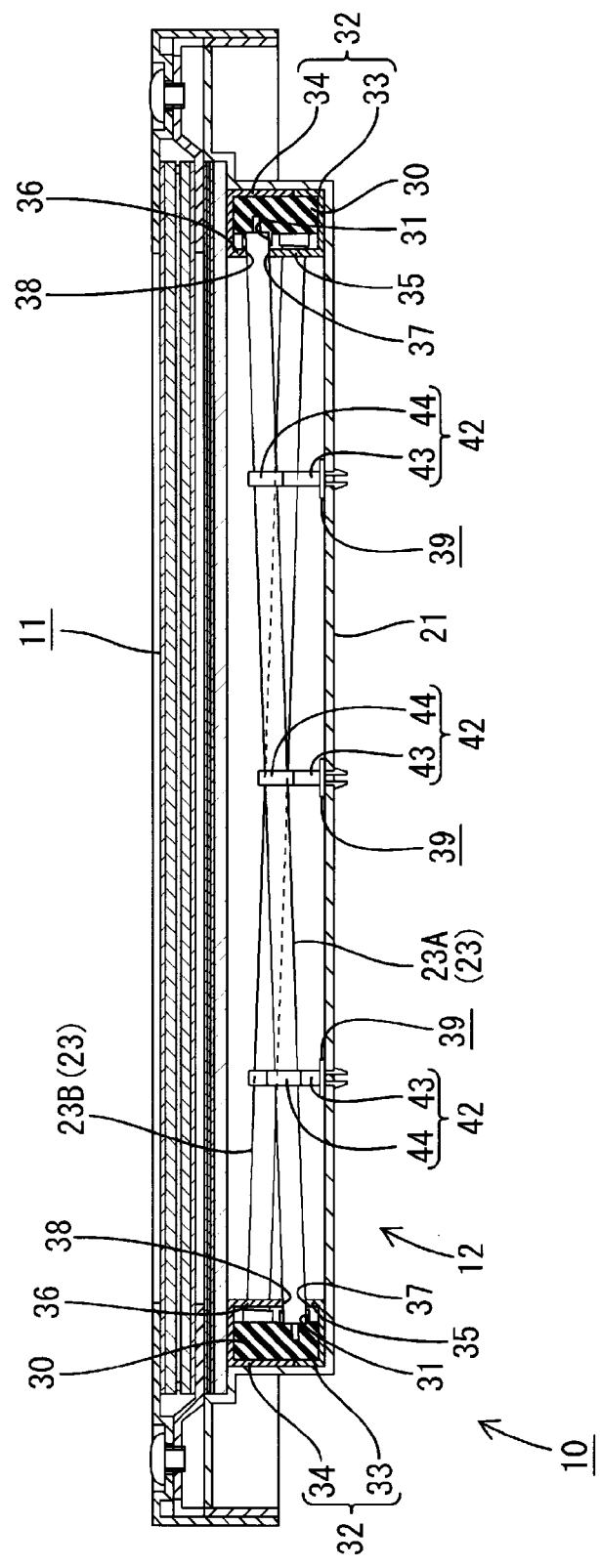
FIG. 10 is a sectional view that illustrates a structure for retaining a first inclined cold cathode tube.
Figure 11:
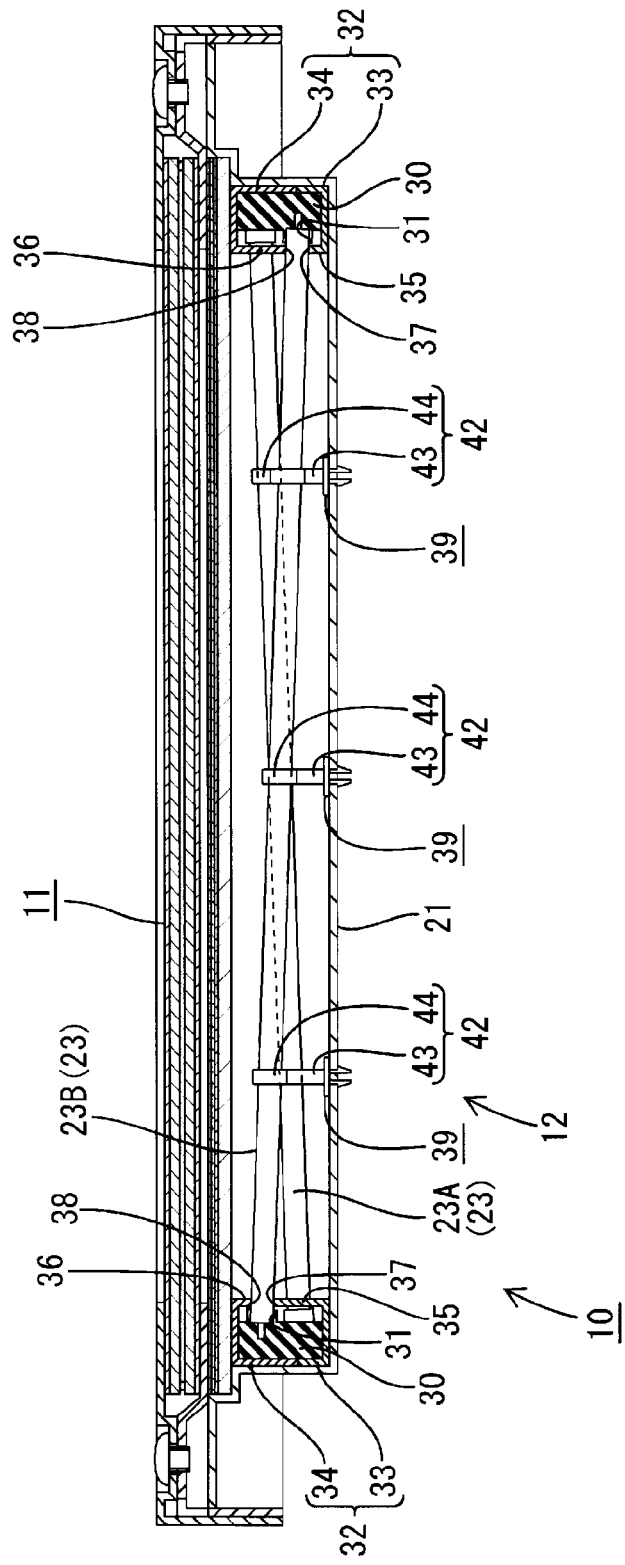
FIG. 11 is a sectional view that illustrates a structure for retaining a second inclined cold cathode tube.

As shown in FIG. 9 to FIG. 11, two holders 30 are mounted, respectively, at the two ends of the cold cathode tube 23. Each holder 30 is preferably made of rubber and the entire structure thereof is formed in a substantially block shape. On the side surface thereof, an insertion hole 31 into which an end of the cold cathode tube 23 can be inserted is arranged such that the insertion hole 31 opens towards the inside. The insertion hole 31 has a form that opens towards an inclined direction with respect to the horizontal direction in correspondence with the inclination angle of the mounted cold cathode tube 23. More specifically, the insertion hole 31 in the holder 30 that is mounted at the end of the lower side (left side end of the first inclined cold cathode tube 23A, and right side end of the second inclined cold cathode tube 23B) among the cold cathode tubes 23 disposed in an inclined posture, is provided in a decentralized condition at a position near the base 21 (rear side) in the holder 30. In contrast, the insertion hole 31 in the holder 30 that is mounted at the end of the higher side (right side end of the first inclined cold cathode tube 23A, and left side end of the second inclined cold cathode tube 23B) among the cold cathode tubes 23 disposed in an inclined posture, is provided in a decentralized condition at a position near the liquid crystal panel 11 (surface side) in the holder 30.

A lamp holder 32 that is described next is attached around the ends of the cold cathode tube 23 and the holder 30. The overall structure of the lamp holder 32 has an elongated, substantially box shape. The lamp holder 32 has a form that extends in a direction that is substantially parallel with the surface S along the direction of alignment of the cold cathode tubes 23 and is also perpendicular or substantially perpendicular to the axial direction of the cold cathode tubes 23. The lamp holder 32 is mounted at positions at both side ends of the base 21 of the backlight device 12. The lamp holder 32 is preferably constructed by assembling a first holder component 33 that supports at the rear side of each cold cathode tube 23 and a second holder component 34 that supports at the surface side of each cold cathode tube 23. Each holder 30 can be housed in the internal space of the lamp holder 32.

Side portions 35, 36 that face the cold cathode tube 23 side in the first holder component 33 and the second holder component 34 have a form that is compatible with increases and decreases in the height of the end of the cold cathode tube 23 to be supported. More specifically, the facing surfaces of the side portions 35, 36 of the two holder components 33, 34 are formed in a concavo-convex shape in conformity with the height position of the end on the lower side of the cold cathode tubes 23 and the height position of the end on the higher side of the cold cathode tubes 23. In the facing surfaces of the side portions 35, 36 of the two holder components 33, 34 are respectively provided holding holes 37, 38 that can hold an individual cold cathode tube 23. The holding holes 37, 38 are provided at the same intervals as the pitch between each cold cathode tube 23. The holding holes 37, 38 are disposed in alignment in the same number as the cold cathode tubes 23. The holding holes 37, 38 each preferably have a substantially semicircular shape, and join together in an aligned manner to form a substantially circular shape that encloses the circumference of the cold cathode tube 23 when the two holder components 33, 34 are put together. Thus, the cold cathode tubes 23 are held in a state in which they are sandwiched from the front side and rear side by the holder components 33, 34. The holding holes 37, 38 are formed in a condition that opens in the direction of inclination with respect to the horizontal direction in correspondence with the inclination angle of the cold cathode tubes 23. The holder components 33, 34 are also held in a state in which they are assembled together by predetermined holding elements.

Figure 12:
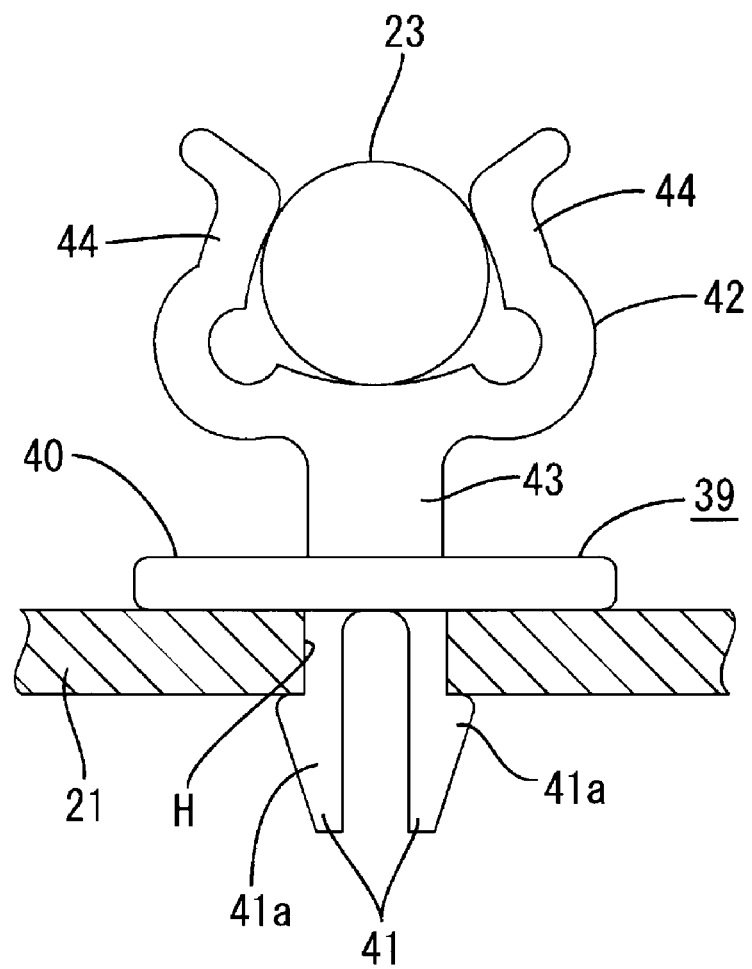
FIG. 12 is a sectional view that illustrates a structure that retains a cold cathode tube using a lamp clip.
Figure 13A:
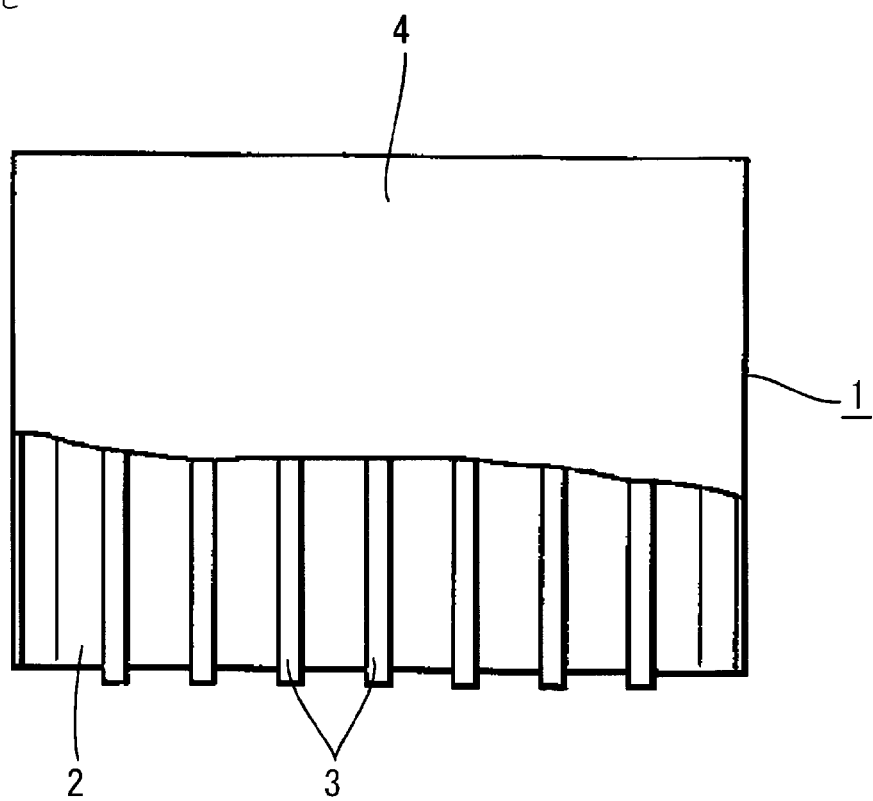
FIG. 13A is a plan view of a conventional example.
Figure 13B:
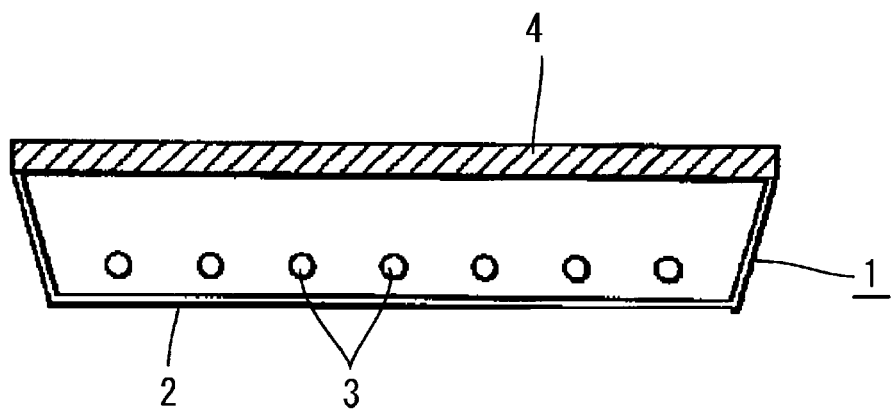
FIG. 13B is a sectional view of a conventional example.
Figure 14:
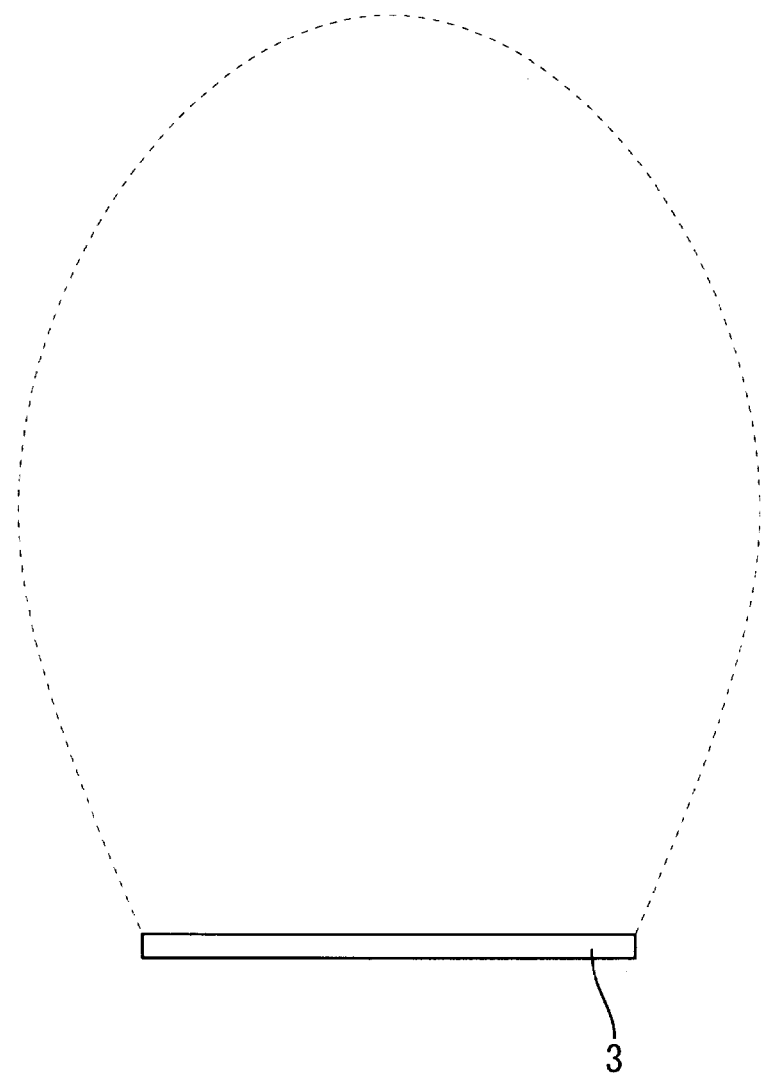
FIG. 14 is an explanatory view of the distribution of light intensity of a conventional linear light source.

A lamp clip 39 for holding an intermediate section (section excluding both end portions) of the cold cathode tube 23 is mounted in the base 21. As shown in FIG. 12, the lamp clip 39 includes a mounting plate 40 that is mounted in the base 21. From the rear surface side of the mounting plate 40 is provided a locking piece 41 that is inserted into a mounting hole H formed in the base 21 and that is locked by the hole edge in a condition in which it protrudes to the rear side. The shape of the locking piece 41 changes elastically so that it becomes temporarily narrower in the process of insertion into the mounting hole H, and when a locking portion 41a thereof passes through the mounting hole H, the locking piece 41 elastically returns to its original shape so that the locking portion 41a is locked by the hole edge of the rear side of the mounting hole H.

A lamp holding portion 42 for holding the cold cathode tube 23 is provided on the front surface side of the mounting plate 40 in a condition in which it projects towards the front surface side. The lamp holding portion 42 includes a linking portion 43 that rises from the mounting plate 40 and a pair of arm portions 44 that extend in a bifurcated shape from the linking portion 43. The two arm portions 44 are capable of changing shape elastically so that the tip portions open outward while maintaining a clearance with respect to each other. The distance between the tip portions is preferably narrower than the external dimensions of the cold cathode tube 23. Accordingly, when mounting the cold cathode tube 23, after the arm portions 44 temporarily change shape elastically and open, the arm portions 44 elastically return towards their original shape so that the inside peripheral surfaces of the two arm portions 44 surround the outer peripheral surface of the cold cathode tube 23 to enable the cold cathode tube 23 to be held in that state.

The lamp clip 39 is disposed at a plurality of positions (for example, three positions in FIG. 10 and FIG. 11) along the axial direction of each cold cathode tube 23. As shown in FIG. 10 and FIG. 11, since the cold cathode tubes 23 are provided in an inclined posture, a distance from the front surface of the base 21 to the rear surface of the cold cathode tubes 23 differs according to the position of the axial direction of relevant cold cathode tube 23. To correspond to this, in the lamp holding portion 42, the linking portion 43 is set so that the protruding height differs in accordance with the mounting position with regard to the above described axial direction of the lamp clip 39 with respect to the base 21. More specifically, the lamp holding portions 42 that hold the first inclined cold cathode tubes 23A are set so that the protruding height of the linking portion 43 gradually increases in the direction from the left side to the right side as shown in FIG. 10. In contrast, the lamp holding portions 42 that hold the second inclined cold cathode tubes 23B are set so that the protruding height of the linking portion 43 gradually increases in the direction from the right side to the left side as shown in FIG. 11. It is thereby possible to support at respectively appropriate height positions the intermediate sections of the cold cathode tubes 23 that are provided in inclined postures.

Other Preferred Embodiments

The present invention is not limited to the preferred embodiments described by the foregoing descriptions and drawings. For example, the following preferred embodiments are also included in the technical scope of the present invention, and various modifications other than those described below may be made without departing from the spirit or scope of the inventive concept of the present invention.

(1) In addition to the preferred embodiments described above, for example, a device having the first inclined cold cathode tube and the parallel cold cathode tube or a device having the second inclined cold cathode tube and the parallel cold cathode tube are also included in the present invention. Further, a device in which the cold cathode tubes are supported in postures of four or more kinds whose axes intersect with each other is also included in the present invention.

(2) Although in the preferred embodiments described above a device was described in which the axes of adjacent cold cathode tubes are disposed in a manner in which they incline towards each other, a device in which the axes of adjacent cold cathode tubes are disposed so as to be parallel or substantially parallel is also included in the present invention.

(3) The angle of inclination of the first inclined cold cathode tube or the second inclined cold cathode tube can be arbitrarily changed, and the angle of inclination of the first inclined cold cathode tube or the second inclined cold cathode tube can also be set differently to each other. It is also possible to change the alignment order of the cold cathode tubes in manners other than the manner described in the second preferred embodiment and the modification example.

(4) Although a device was described according to the first preferred embodiment in which the first inclined cold cathode tube is inclined to the opposite side with respect to the second inclined cold cathode tube in a condition that sandwiches the surface along the direction of alignment of each cold cathode tube, a device in which, for example, the first inclined cathode tube is inclined in the same direction as the second inclined cold cathode tube with respect to the surface along the direction of alignment of each cold cathode tube and in which that angle of inclination is set differently to the angle of inclination of the second inclined cold cathode tube is also included in the present invention.

(5) Although a device was described according to the above preferred embodiments in which height positions at a central portion in the length direction of the cold cathode tubes are preferably made equal, a configuration may also be adopted in which the height positions at the central portion in the length direction of the cold cathode tubes are different. The number of cold cathode tubes can also be changed arbitrarily.

(6) Although a device was described according to the above preferred embodiments in which the cold cathode tubes are preferably aligned in parallel along the lengthwise direction of the liquid crystal panel, a device in which the cold cathode tubes are disposed, for example, in a fan shape or a donut shape (ring shape) is also included in the present invention.

(7) Although the above preferred embodiments describe a device which preferably uses cold cathode tubes as a linear light source, it is also possible to use an electrical discharge tube such as a xenon tube or a hot cathode tube in addition to a cold cathode tube. In addition to an electrical discharge tube, a device in which a large number of electroluminescence elements such as LEDs are linearly disposed is also included in the present invention.

(8) Although the above preferred embodiments describe a case in which optical sheets as optical components preferably are integrally incorporated into a backlight device, the optical sheets may be provided as separate members to the backlight device.

(9) Although the above preferred embodiments describe a device which uses a liquid crystal panel as a display component, it is also possible to use another display component that electrically controls the deflection property of an electromagnetic field. Further, in addition to a display component that electrically controls the deflection property of an electromagnetic field, it is possible to, for example, provide a physical or mechanical shutter portion for each pixel and use a display component that controls the intensity of electromagnetic waves (light).

(10) Although the above preferred embodiments describe an example of a backlight device that is used in a liquid crystal display device, the present invention is also applicable to an illumination device for simply natural lighting.

(11) The structure for retaining cold cathode tubes as illustrated in the third preferred embodiment can also be arbitrarily applied to a device in which the disposition or posture of the cold cathode tube is changed, such as that described in the second preferred embodiment or the modification example thereof.

(12) It is possible to arbitrarily change the shape or number of components of the holder or the lamp holder described in third preferred embodiment.

(13) It is possible to arbitrarily change the shape, number, or disposition of the lamp clips described in the third preferred embodiment.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
a display component; and an illumination device arranged to supply light to the display component, the illumination device including a plurality of light sources arranged in an aligned state;

holders, each of which has an insertion hole into which an end of a respective one of the light sources is inserted, the holders being mounted respectively at two ends of each of the light sources;

lamp holders, each of the lamp holders is arranged to hold a portion of the holders and includes a holding hole arranged to hold a respective one of the light sources; wherein the plurality of light sources are supported in at least two different postures such that axes of the light sources in the at least two different postures intersect with each other and are relatively inclined with respect to each other;

the plurality of light sources include a light source that is supported such that an axis of the light source is inclined with respect to a display surface of the display component the insertion holes of the holders are arranged to support a corresponding one of the light sources at an inclined angle with respect to the display surface;

the holding hole is arranged to hold a corresponding one of the light sources at the inclination angle;

each of the lamp holders is defined by a first holder component arranged to support the light source at a side away from the display component and a second holder component arranged to support the light source at a side closer to the display component;

the holding holes are defined by a combination of a first semicircle defined in the first holder component and a second semicircle defined in the second holder component; and the holding hole of the first holder component and the holding hole of the second holder component join together to define a substantially circular shape that encloses an outer circumference of the light source.

2. The display device according to claim 1, further comprising:

an optical component that is disposed between the display component and the illumination device.

3. The display device according to claim 1, wherein the display component is a liquid crystal panel.

4. The display device according to claim 1, wherein:

a portion of the holders include insertion holes arranged on a lower side of the holder with respect to the display component; and another portion of the holders include insertion holes arranged on a higher side of the holder with respect to the display component.

5. The display device according to claim 1, further comprising a plurality of additional holding holes defined in the lamp holders, wherein:

each of the lamp holders extends in a direction that is substantially parallel with the display surface of the display component and substantially perpendicular to an axial direction of the light source; and there are as many of the holding holes and additional holding holes as there are light sources, and the additional holding holes are arranged such that they are spaced apart at intervals that are the same as a pitch between the light sources.

* * * * *